United States Patent [19]
Linde et al.

[11] Patent Number: 5,641,838
[45] Date of Patent: Jun. 24, 1997

[54] THERMOSTABLE COATING MATERIALS

[75] Inventors: Harold George Linde; Rosemary Ann Previti-Kelly, both of Richmond; Thomas Joseph Reen, Essex Junction, all of Vt.

[73] Assignee: International Business Machines Corporation, Armonk, N.Y.

[21] Appl. No.: 486,906

[22] Filed: Jun. 7, 1995

Related U.S. Application Data

[62] Division of Ser. No. 250,224, May 27, 1994, Pat. No. 5,451,655.

[51] Int. Cl.$^6$ .................................................. C08G 77/26
[52] U.S. Cl. ................................................ 525/431; 528/26
[58] Field of Search .............................. 525/431; 528/26

[56] References Cited

U.S. PATENT DOCUMENTS

| | | | |
|---|---|---|---|
| 3,179,630 | 4/1965 | Endrey | 260/78 |
| 4,246,038 | 1/1981 | Vaughn, Jr. et al. | 106/287.16 |
| 4,499,252 | 2/1985 | Igarashi et al. | 528/38 |
| 4,758,476 | 7/1988 | Sekine et al. | 428/473.5 |
| 5,002,831 | 3/1991 | Plueddemann | 428/447 |
| 5,021,585 | 6/1991 | Dougherty et al. | 548/406 |
| 5,036,145 | 7/1991 | Echterling et al. | 525/431 |

FOREIGN PATENT DOCUMENTS

| | | |
|---|---|---|
| 0317205A2 | 5/1989 | European Pat. Off. . |
| 56-157427 | 12/1981 | Japan . |
| 63-291924 | 11/1988 | Japan . |

OTHER PUBLICATIONS

Hiemenz, Paul. "Polymer Chemistry", p. 335 1984.
Babu, G.N. "Silicon–Modified Polyimides: Synthesis and Properties". Proceedings of Soc. of Plastics Engineers 1982.

*Primary Examiner*—Margaret W. Glass
*Attorney, Agent, or Firm*—Heslin & Rothenberg, P.C.

[57] ABSTRACT

Novel intermediate compounds capable of being applied to a semiconductor precursor by spin-on methods which exhibit good planarity and gap-fill characteristics, the cured composites of which are capable of withstanding temperatures in excess of 500° C. The disclosure further encompasses a process for fabricating semiconductor devices utilizing the intermediate compounds and its composite.

10 Claims, 3 Drawing Sheets

THERMOSTABLE COATING MATERIALS

This application is a division, of application Ser. No. 08/250,224 filed May 27, 1994, now U.S. Pat. No. 5,145,655.

TECHNICAL FIELD

The invention relates generally to novel thermostable composites and related intermediates as well is methods for use of the same, more particularly to the use of these novel thermostable composites and intermediates in the fabrication of semiconductor devices. The composites comprise perylene diimide and a silsesquioxane and are made from perylene anhydride and an aminosilane.

BACKGROUND

The fabrication of integrated circuits depends upon the construction of a desired pattern of electrically active impurities within a semiconductor body, and upon the formation of a corresponding interconnection pattern for their operating characteristics.

Fabrication of integrated circuits thus involves a great number of different processes well known in the art, examples being chemical vapor deposition of semiconductors and insulators, oxidation, solid state diffusion, ion implantation, vacuum deposition, various lithographic techniques and numerous types of etching techniques. A typical IC fabrication process utilizes a great number of cycles, each of which may utilize a specific sequence of one or more of the above referenced fabrication techniques.

As is well known in the art, films applied to the semiconductor may be used to selectively limit the effect of a certain process to a regionally specific area. When a film is used in this manner it is commonly referred to as being a mask. For example, in order to dope a regionally specific area on a semiconductor one may apply a film that is impermeable to the specific doping process to be utilized. After doping the desired region, the film may be removed.

It is necessary for the various films utilized in the IC fabrication process to be compatible with a large number of lithography, etching, doping and other IC fabrication techniques. However, the polyimides or spin-on glasses (SOG) commonly used as films today have a practical operating limit below 500°C. This severely restricts the sequence of fabrication steps that can be employed in the presence of such films.

Therefore there exists a need for a film capable of application on semiconductor devices by methods known in the IC fabrication art that is capable of withstanding temperatures in excess of 500° C. There further exists a need for such a film that is compatible with a wide range of IC fabrication processes such as various etching, doping, deposition and implantation techniques.

SUMMARY OF THE INVENTION

It is an object of the invention to provide a thermostable composite capable of withstanding temperatures in excess of 500° C.

It is a further object of the invention to provide a thermostable composite for semiconductor devices which may be applied by methods amenable to the IC fabrication.

It is a further object to provide a coating having the requisite planarity and gap-fill characteristics to be useful in the fabrication of semiconductor devices.

It is a further object of the invention to provide a thermostable composite exhibiting RIE etch characteristics that allow it to be variably etched relative to other materials commonly used in IC fabrication.

It is a further object of the invention to provide a thermostable composite capable of acting as a mask and/or mandrel in that it is capable of being removed by means well known in the art of IC fabrication, examples being $CF_4$/oxygen RIE and chemical-mechanical polishing.

These and other objects, features and advantages are provided by the present invention, which in one aspect relates to a thermostable composite comprising: (a) a perylene diimide; and (b) a polysilsesquioxane. In another aspect the thermostable composite comprising perylene diimide and the polysilsesquioxane are in a ratio of one perylene for each of four or more silicon atoms in the polysilsequioxane.

The invention further provides for a thermostable composite produced by the process of combining perylene dianhydride and four equivalents of a primary or secondary aminoalkyl alkoxysilane in a solvent, mixing the combination at a temperature between 15° and 80° for four to twenty hours, setting by heating from the mixing temperature to a final temperature of about 150° over the course of 10 to 30 minutes; and curing at 500° C. under nitrogen for about 30 minutes. The composite may be further characterized in that it exhibits less than 1% weight loss upon exposure to temperatures from 500° to 620°C. for one hour and also exhibits an RIE etch rate more than 4 times that of silicon nitride in 20/80 $CF_4/O_2$ and less than ¼ that of silicon nitride in pure $O_2$.

An additional aspect of the invention includes a process for making a thermostable composite which comprises (a) mixing perylene dianhydride in an inert solvent with about four equivalents of one or more aminosilanes having a formula of:

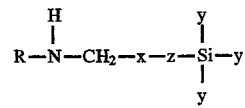

wherein R is selected from the group consisting of H, alkyl and alkylamine; X is selected from the group consisting of alkyl of at least two carbons and aryl; Z is alkyl or a direct bond; Y is selected from the group consisting of alkoxy, halo and silazane; and (b) heating said reactants, thereby forming a thermostable coating. For example, the aminosilane utilized may be an aminoalkyltrialkoxysilane such as aminopropyltriethoxysilane.

An additional aspect of the present invention includes a process for making a thermostable coating comprising the steps of mixing perylene dianhydride in an inert solvent with about 4 equivalents of one or more aminosilanes having a formula of:

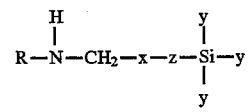

wherein R is selected from the group consisting of H, alkyl and alkylamine; X is selected from the group consisting of alkyl of at least 2 carbons and aryl; Z is alkyl or a direct bond; Y is selected from the group consisting of alkoxy, halo and silazane; and heating said reactants, thereby forming a thermostable coating.

The above process may also be performed utilizing aminopropyltriethoxysilane. In addition, the process may contain the additional step of adding from 0.05 to 0.15% by weight of water to the aminosilane 1 to 2 hours before mixing with the perylene dianhydride. The mixture of the perylene dianhydride and aminosilane may also be aged prior to heating. By "aged" is meant that the perylene dianhydride and the aminosilane are allowed to remain in contact for some period of time at ambient temperature. Furthermore, in the heating of said reactants, the temperature may be increased from room temperature to approximately 150° C. along with the additional step of curing at a temperature between 500° C. and 620° C.

The present invention further encompasses a method of fabricating an integrated circuit comprising the steps of: providing a substrate incorporating integrated circuit elements; combining perylene dianhydride and an aminoalkylalkoxysilane in a solvent thereby forming a mixture; applying said mixture to the substrate; and heating the mixture to produce a thermostable film on said substrate. The mixture may be applied by various spin-on techniques. The method may also further comprise the additional step of removing at least a portion of said film, an example being by 80:20 oxygen/CF4 RIE or chemical-mechanical polishing. In addition, prior to removal of a portion of said film the semiconductor substrate may be subjected to a temperature exceeding 500° C.

DETAILED DESCRIPTION OF THE INVENTION

Figure 1:
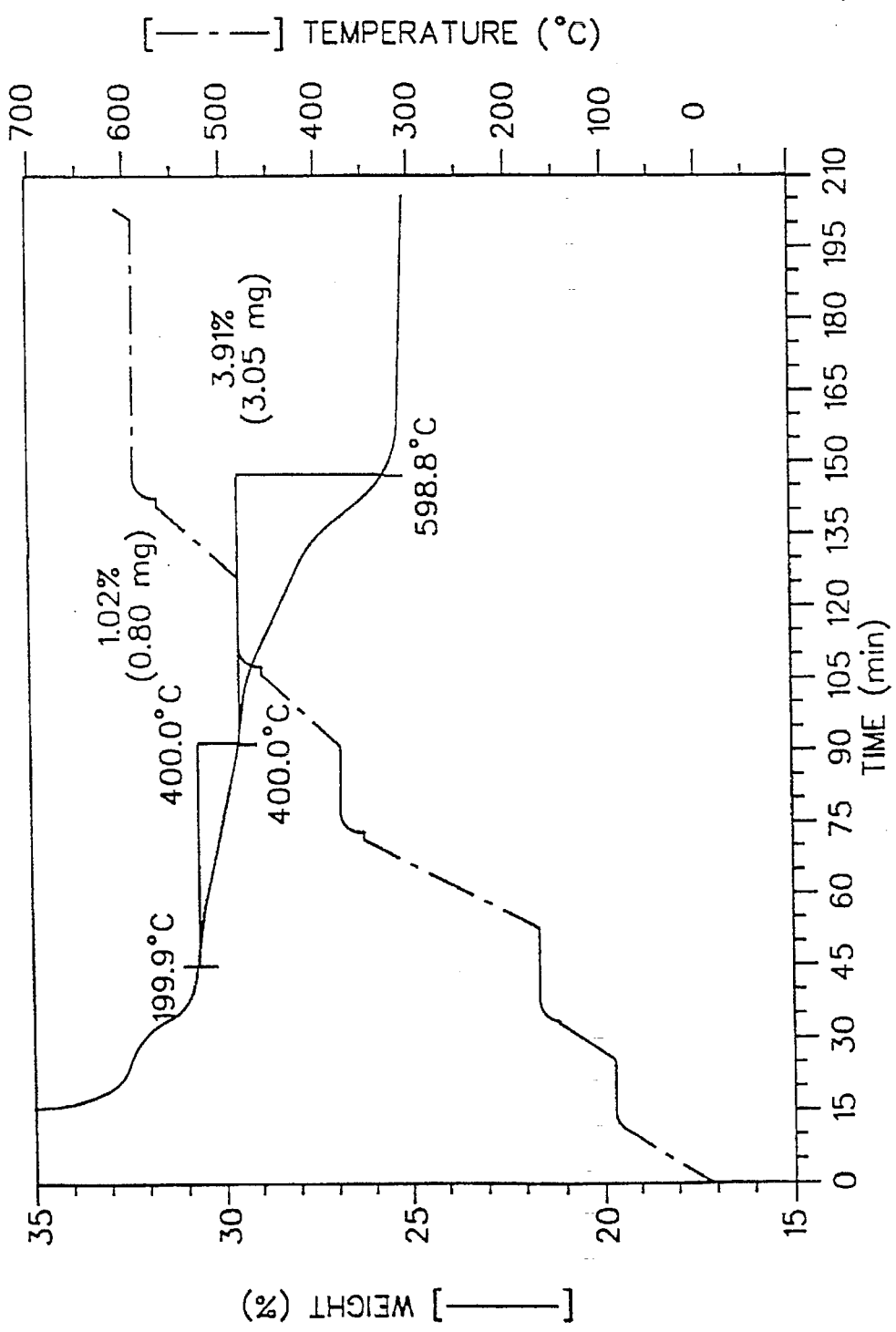
FIG. 1 is a graph of the weight of Accuglass SQ-2 as a function of time and temperature.

The present invention relates to a novel thermostable composite which is believed to comprise a perylene diimide and an alkyl poly(silsesquioxane) having the formula of:

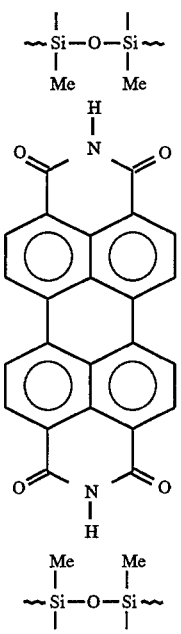

The thermostable composite shown above may be made as shown by the reaction chemistry set forth below:

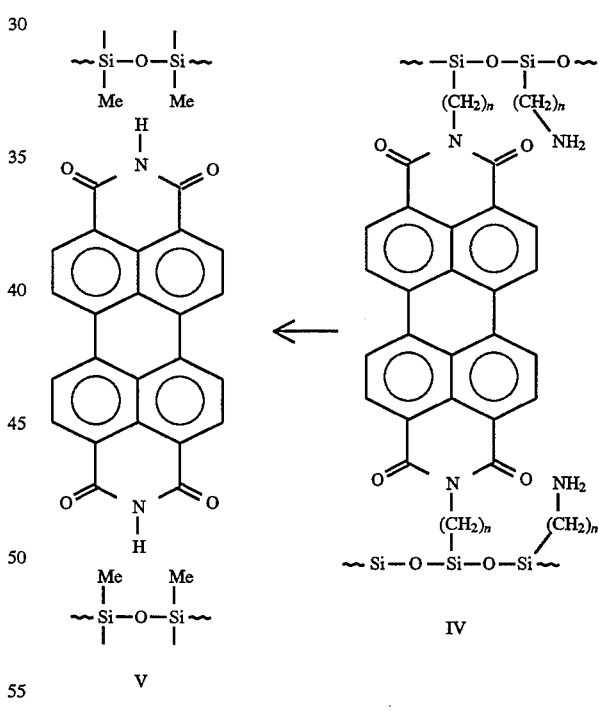

The method of making the thermostable composite involves providing a solution or suspension of perylene dianhydride in an appropriate solvent, such as N-methylpyrrolidinone (NMP). Other useful solvents include dimethylacetamide (DMAC), dimethylformamide (DMF), dimethylsulfoxide (DMSO) or suitable mixtures of these solvents with various conventional hydrocarbon solvents or other inert solvents in which a compound of Formula I is soluble.

An aminoalkyl alkoxysilane (AAS) encompassed by Formula I is preferably provided in an amount such that the ratio of the perylene anhydride and the AAS is approximately in a ratio of 1:4 or more. The AAS is added to the perylene dianhydride solution or suspension. It is possible to utilize more than one aminoalkyl alkoxysilane together with the perylene dianhydride to form various composites of formula V. The components are preferably mixed at temperatures in the range of 15° C. to 80° C. and are stirred for 4 to 20 hours to insure uniformity of the solution. Thereafter, the mixture may be heated at temperatures to about 150° C. and then subsequently from 500° C. to 620° C. in an inert atmosphere causing the formation of the composite of Formula V. Generally the temperature, duration and atmospheric conditions necessary to cure the intermediate will depend upon the thickness of the intermediate, the amount of solvent present with the intermediate and other conditions known to those skilled in the art. Typically, a film formed from aminopropyltriethoxysilane in NMP having a thickness of about 1.5 microns will cure in 30 minutes when subjected to a temperature of approximately 500° C. in a nitrogen atmosphere.

As indicated above, one of the objects of the present invention is to provide a thermostable composite which is advantageous in the fabrication of semiconductor devices, such as integrated circuits. In solution in appropriate solvents, such as NMP, the compound of formula II compound of formula IV has excellent planarity and gap-fill characteristics and it is capable of being applied to a semiconductor substrate having integrated circuit elements by techniques well known in the art, an example being spin-on applications. Formula II is meant to indicate that each anhydride of the perylene dianhydride has been opened by one mole of amine to provide an amide and a second mole of amine has formed a salt with the liberated carboxylic acid. The substitution pattern is probably statistically random, but this is not known.

Where the soluble intermediate of formula II is intended to be applied in solution with spin-on techniques, such as in IC fabrication, the solvent should be of sufficient volatility to allow significant removal at temperatures about 150°. The solvents are not unduly limited and include those enumerated hereinabove.

It has been discovered that in some cases superior spin-on coatings may be achieved by performing additional steps during the preparation of compounds having formula IV, an example being the compounds created from aminopropyltriethoxysilane in an NMP solvent. For such compounds it is advantageous to equilibrate the aminoalkyl alkoxysilane with a small amount of water, from 0.5 to about 1.5 µl $H_2O$ per ml of alkoxysilane, with about one 1 µl/ml being preferred. Excess water (greater than 2 µl/ml) tends to create spin irregularities as well as cause the film to crack whereas excess of certain aminoalkyl alkoxysilanes, such as aminopropyltriethoxysilane, may cause dewets on apply or pinholes in the coatings. It is similarly advantageous to age this solution for approximately one to two hours prior to addition of the AAS to the perylene dianhydride solution or suspension. It has been discovered that aging the aqueous solution appears to produce a film that is less likely to haze or dewet.

The AAS solution and the perylene dianhydride are mixed for approximately 4 to 20 hours, preferably for 12 hours using methods well known in the art, examples being mechanical stirrers or roller mills. The mixture may be warmed at temperature from 50° C. to 80° C. for a similar length of time to likewise insure solution uniformity. For certain intermediates it may also be preferable that the ratio of the reactants is close to stoichiometric, since excess anhydride appears to favor hazy films post initial thermal cure.

It is also possible to add a compound capable of forming a surfactant within the mixture, such as tetrafluorophthalic anhydride, to improve film quality.

The method and manner of applying spin-on solutions, such as those of Formula IV, to a semiconductor device are well-known in the art and the specific application of the same will vary with regard to the tolerances demanded by the particular semiconductor device, the desired thickness of the coating and the solution being applied. It has been found that the soluble intermediates of Formula IV can be applied as about 41% solutions by volume in NMP at approximately 2500–6000 rpm and spin times of approximately 15 seconds.

After the solution of Formula IV has been applied to the semiconductor or IC precursor, the solution should be heated in order to drive off the solvent. The actual heating conditions, i.e. temperature, pressure and time, may vary over wide ranges depending on the AAS used, the solvent, the thickness of the spin-on coating as well as other factors which are apparent to those skilled in the art. However, the solvent, alcohol and water (formed as by-products in the formation of amides and polysilsesquioxanes) will typically be driven off when the coating is cured.

After applying the solution of formula IV to the semiconductor substrate it may be cured by subjecting the coated substrate to heat. It is preferred that the cure profile proceed from room temperature and be increased in a ramp in order to reduce the possibility of developing cracks in the film or coating. The spin-on coating may, thus, be heated from approximately 15° C. to a final temperature of about 150° C. over the course of 10 to 30 minutes. After the ramped heating the coating may thereafter be cured at temperatures from 500°C. to 620° C. in an inert atmosphere, such as nitrogen. Films of formula IV, thermally cured to 400° C. still appear bright red; after 600° C. the films of formula V appear gray. The length of time necessary to cure the coating will depend upon the temperatures used, the thickness of the coating and other conditions well known to one skilled in the art. For a typical semiconductor substrate film of about 1 micron thickness, curing times of approximately 30 minutes at 500° C. in a nitrogen atmosphere will be sufficient to adequately cure the coating, thereby forming the thermostable composite of formula V. It is believed that, in curing, to the composite of perylene diimide and silsesquioxane is formed. The reaction is accompanied by pyrrolytic decomposition of the aminoalkyl residue on the silicon. Due to potential outgassing from the composite it is preferred that the compound of formula IV be cured at a temperature greater than the temperatures involved in later fabrication steps to which the cured compound of Formula V will be exposed. For example, if the cured compound will be exposed to the subsequent deposition of polysilicon at a temperature of 590° C., then the compound of formula IV may be cured at a temperature of 620° C.

Figure 2:
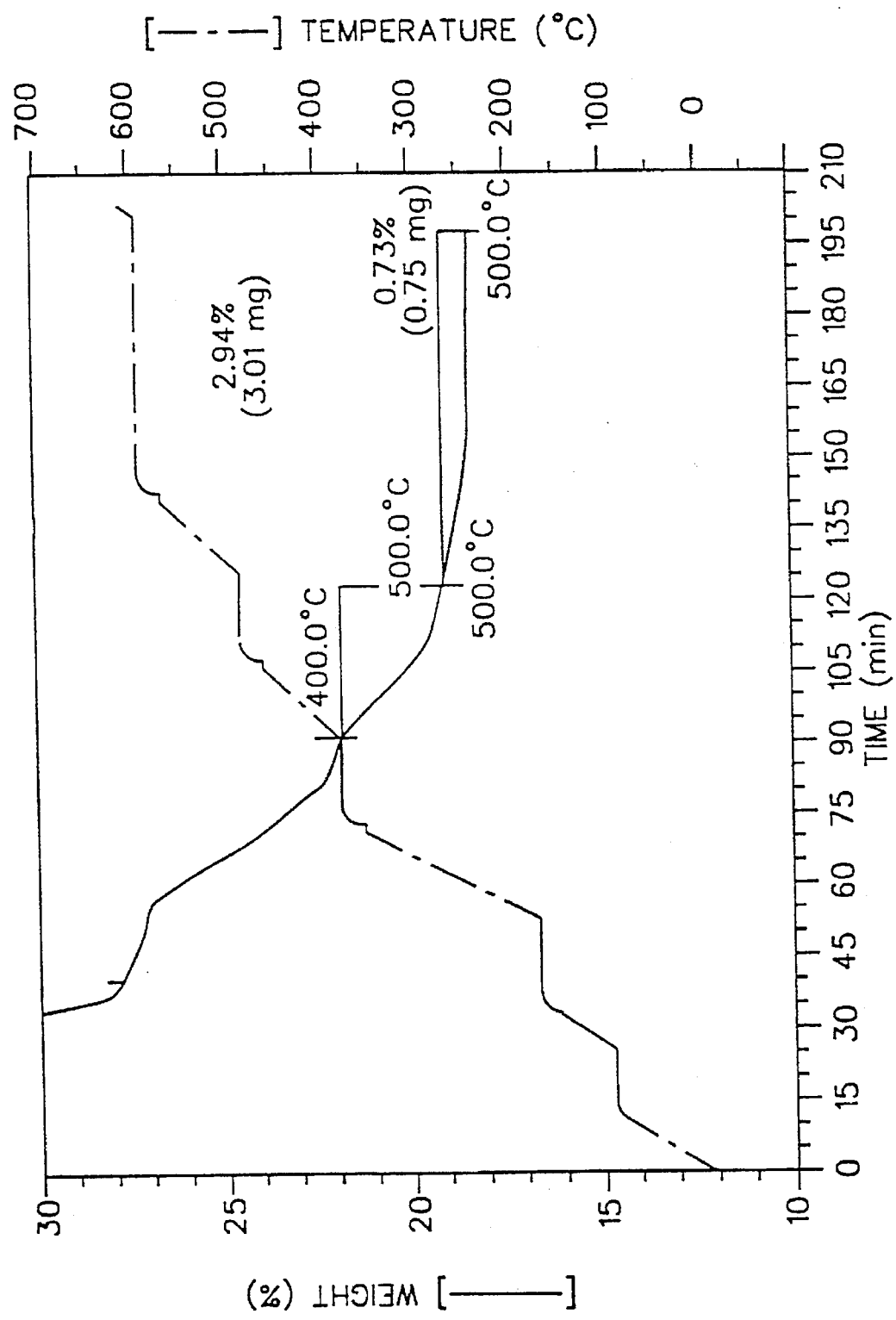
FIG. 2 is a graph of the weight of the thermostable composite, formed from the reaction between perylene dianhydride and aminopropyltriethoxysilane in NMP, as a function of time and temperature.

FIG. 1 represents data obtained from the testing of a spin-on glass (SOG) commonly used in the IC fabrication processes, namely Accuglass SQ-2198 which is commercially available through Allied Signal. This SOG was subjected to temperatures in excess of 500° C. and as can be seen, it experienced extensive decomposition at temperatures over 500° C. However, by reviewing FIG. 2 it can be seen that the coatings of the present invention, here coatings formed in accordance with Example 1 below, form a thermostable composite above 500° C. and experience significantly less decomposition at temperatures exceeding 500°C.

This spin-on film may be utilized in connection with application of materials or other processes which subject the semiconductor precursor to temperatures in excess of 500° C. An example being the deposition of N+polysilicon which is typically deposited at temperatures in excess of 500° C.

Figure 3:
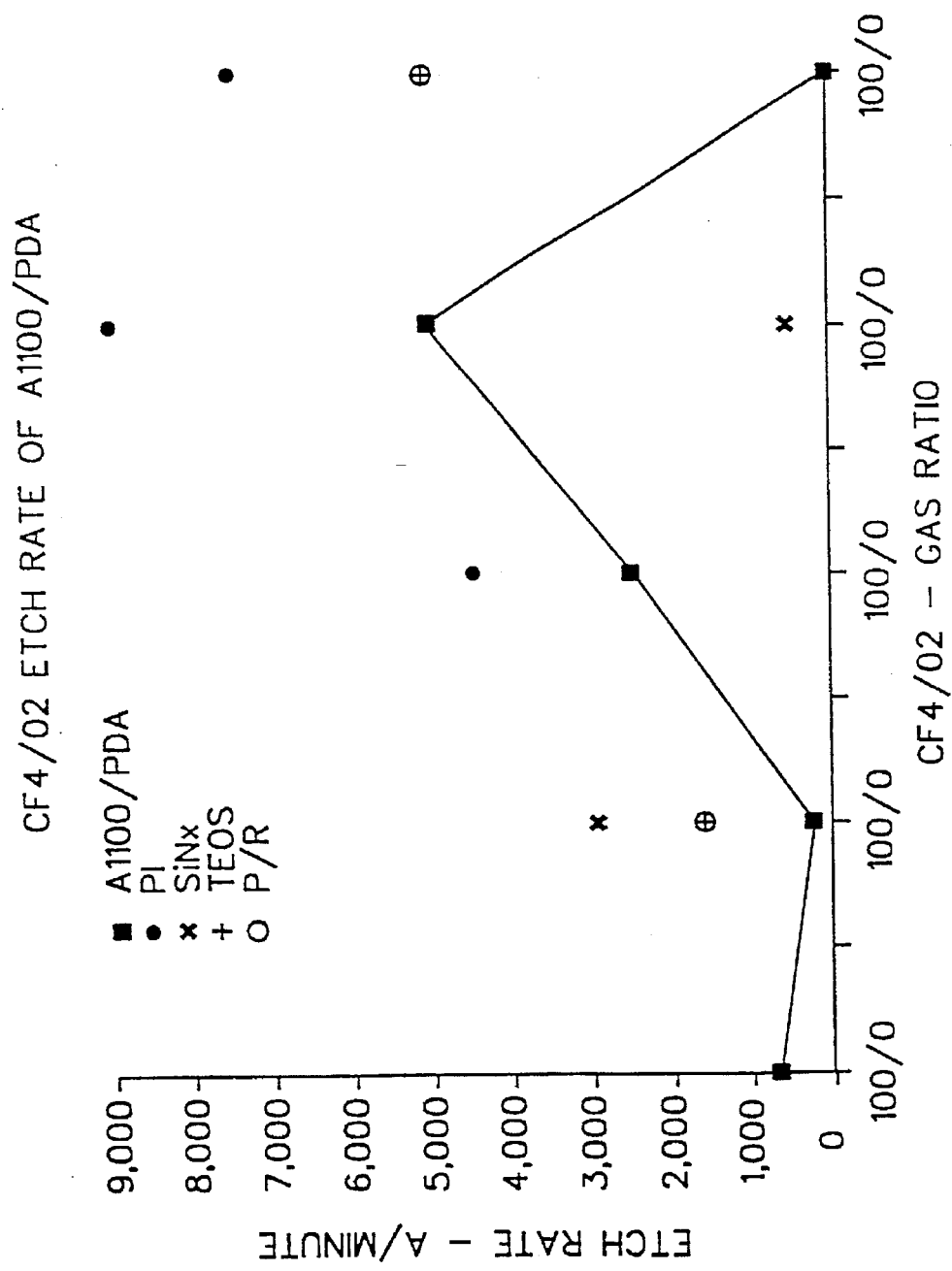
FIG. 3 is a graph depicting the etch rate of multiple compounds under varied $CF_4/O_2$ gas ratios.

In addition, since the cured films contain considerable silicon-oxygen functionality, they are resistant to oxygen RIE etching. However, these same coatings are readily etchable using $CF_4/O_2$ (20:80) or chemical/mechanical polishing. A comparison of the etch rate of the thermostable composite with other commonly used semiconductor films and masks can be seen in FIG. 3. It should be noted that the etch rate of the thermostable composite exceeds that for $SiN_x$ when exposed to a mixture of 20/80 ($CF_4/O_2$) but it is significantly lower than the etch rate of $SiN_x$ in 100% $O_2$.

EXAMPLE 1

Perylene dianhydride (20.2 g, 0.0515 mol) is introduced into a 250 mL polyethylene bottle and suspended in 100 mL dry NMP. Aminopropyl triethoxysilane (45 mL, 0.1914 mol) is added to the mixture and the solution is stirred overnight. The foamy product settles into a deep red/brown solution, which can be warmed to 80° C. to insure uniformity. The resulting solution formed good spin on films when high torque (4000 rpm) and low spin times (10–15 sec.) were employed. After heating, the oligomeric composition favored good planarization and gap filling, and thermal testing demonstrated high temperature stability of the composite, see FIG. 2. The cured films contained considerable silicon-oxygen functionality and were resistant to oxygen RIE. However, the coatings were readily etchable using $CF_4/O_2$ (20:80) RIE conditions.

EXAMPLE 2

Ten milliliters of aminopropyltriethoxysilane and 3.92g of perylene dianhydride were added to 20 mLs of NMP to form a solution. This solution was spin applied to silicon wafers, metalized wafers and patterned wafers at 500 RPMs for 7 seconds, 1000 RPMs for 7 seconds, and 3000 RPMs for 30 seconds. Thereafter it was baked at 105°–115°–125°–135°–150°–150°–1150° C. for a total of 10 minutes and cured at 500° C. for 30 minutes in nitrogen atmosphere. The resulting films on the respective wafers were tested and the results obtained were:

etch rate at 20:80 $CF_4/O_2$ was approximately 5000 A°/min and the etch rate at 100% $O_2$ was approximately 33 A°/min 1 μthick post 500° C.;

Film stress was 30 mPa/Tensile;

Chemical Mechanical Polishing rates varied from 2,500 A°/min. to 1300 A° /min. depending on the slurry selected whereas the CMP rate of $SiN_x$ under the same conditions was approximately 40°–50 A°/min.

EXAMPLE 3

Perylene dianhydride, aminopropyltriethoxysilane (A1100), NMP and water were combined in a plastic bottle, in the amounts indicated in the chart below, and then mixed on a roller mill overnight. Thereafter, the solutions were applied to a semiconductor substrate via spin-on techniques, heated as in Example 2, and cured at 563° C. for 30 minutes in a $N_2$ atmosphere. The results were as follows:

| Trial | Perylene Dianhydride | A1100 | $H_2O$ | NMP | Results |
|---|---|---|---|---|---|
| 1 | 3.92 g (0.010 moles) | 9.40 mL (0.040 moles) | — | 20 mL | Solids remain in solution but films prepared are good |
| 2 | 3.92 g | 10.0 mL (0.0425 moles) | — | 20 mL | Dewets appear in cured films |
| 3 | 3.93 g | 10.0 mL | 2 drops | 20 mL | Dewets, worse than those of #2, appear in the cured films |
| 4 | 3.92 g | 10.0 mL | — | 20 mL | Dewets, worse than those of #2, appear in the cured films |
| 5 | 3.92 g + excess | 10.0 mL | — | 20 mL | Good films are produced upon cure |
| 6 | 30.3 g (0.773 moles) | 72.6 g (0.3092 moles) | — | 200 mL | Dewets apear in cured film |
| 7 | 19.6 g (0.050 moles) | 47 mL (0.2000 moles) | — | 100 mL | Good films produced upon cure |
| 8 | 21.0 g (0.05357 moles) | 50.35 mL (0.2143 moles) | — | 107 mL | The cured film possesses some dewets and the polymer puckered on cure |

EXAMPLE 4

A1100 is placed in a plastic bottle along with a specified amount of water; it is then equilibrated by placing the bottle on a roller mill for approximately 1 hour. Thereafter, perylene dianhydride, NMP and the equilibrated aminopropyltriethoxysilane (A1100) were combined in a separate plastic bottle and mixed on a roller mill overnight. The solution was applied to a substrate in accordance with the conditions stated above in respect to Example 3. The component ratios used in the individual runs and the results of these trials are indicated in the chart below.

| Trial | Perylene Dianhydride | A1100 | H$_2$O | NMP | Tetrafluoro-phthalic Acid | Results |
|---|---|---|---|---|---|---|
| 1 | 19.6 g (0.050 moles) | 47 mL (0.200 moles) | 47 μl | 100 mL | — | Good films were formed upon curing |
| 2 | 5.0 g (0.01275 moles) | 12 mL (0.05108 moles) | 6 μl | 25.5 mL | — | The film does not dewet although it hazes upon the initial heating |
| 3 | 5.0 g | 12 mL | 12 μl | 25.5 mL | — | The film does not dewet although it hazes upon the initial heating |
| 4 | 5.0 g | 12 mL | 24 μl | 25.5 mL | — | The film does not dewet although it hazes upon the initial heating |
| 5 | 19.6 g | 47 mL | 12 μl | 100 mL | 0.56 g | Reduced dewets |

EXAMPLE 5

A solution is formed by mixing 3.02 g (0.007704 moles) of perylene dianhydride, 15.4 ml NMP and 7.24 ml (0.03081 moles) of A1100. The solution is heated to a temperature of 50° C. for a period of 12 hours and thereafter applied to a semiconductor substrate and cured in accordance with the techniques of Example #3 above. Good films were produced under this process.

EXAMPLE 6

A solution was similarly formed using the same material and ratios as Example 5 above except that the amount of (aminoethylaminomethyl) phenethyltrimethoxysilane (A0698) added was 6 ml. Unreacted anhydride remained after having been on the roller mill overnight. Then 4.7 ml of A1100 and 5 ml NMP were added to the contents of the plastic bottle thereby forming a good solution, which was stable for approximately 5 days or more.

EXAMPLE 7

The compound of formula IV (produced from the mixture of perylene dianhydride and A1100 in NMP) is spun onto the surface of a silicon based wafer. The compound is applied at static apply for 7 seconds, 500 RPM for 7 seconds, 1000 RPM for 7 seconds and 3000 RPM for 15 seconds. The wafer is then heated in air in a ramped fashion (105°–115°–125°–135°–150°–150°–150°–1150°) to 150° C. over 10 minutes followed by heating in a N$_2$ atmosphere furnace for 30 minutes at 620° C. Thereafter, a positive photoresist is applied to the wafer and baked. Selected portions of the photoresist are then exposed on a G-line stepper. KOH is used to develop the photoresist by exposing the desired portions of the compound of formula V. These exposed portions are then etched in 80:20 O$_2$/CF$_4$ for 4 minutes thereby forming a patterned layer of the compound of formula V. The remaining photoresist is then stripped by application of N-butyl acetate and isopropyl alcohol (NBA/IPA 3 minutes/3 minutes). Thereafter, a 950 Å layer of polysilicon is deposited upon the wafer at 590° C. over 10 minutes.

While the invention has been particularly shown and described with reference to preferred embodiments thereof, it will be understood by those skilled in the art that other changes in the form and details may be made therein without departing from the spirit and scope of the invention.

What is claimed is:

1. A thermostable composite consisting essentially of a perylene diimide having the structure

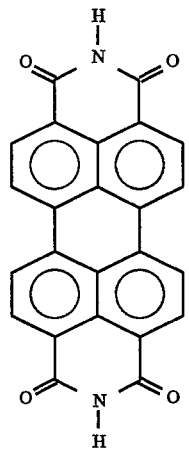

and a poly(silsesquioxane), said thermostable composite produced by the process of:
   (a) combining perylene dianhydride and a primary or secondary aminoalkyl-alkoxysilane in a solvent in a molar ratio of about 1:4;
   (b) mixing at a temperature between 15° C. and 80° C. for 4 to 20 hours;
   (c) heating under conditions such that a mechanically stable solid is formed; and
   (d) curing at 500° to 620° C. under nitrogen for about 30 minutes.

2. A thermostable composite produced by the process of claim 1 comprising:
   a combining perylene dianhydride and a primary or secondary aminosilane in a solvent in a molar ratio of about 1:4;
   (b) mixing at a temperature between 15° and 80° C. for 4 to 20 hours;
   (c) setting by heating to final temperature of about 150° C. over the course of 10 to 30 minutes; and
   (d) curing at 500° to 620° C. under nitrogen for about 30 minutes.

3. The composite according to claim 1 further characterized in that said composite exhibits less than 1% weight loss upon exposure to temperatures from 500° to 600° C. for one hour.

4. The composite according to claim 1 further characterized in that said composite exhibits an RIE etch rate more than 4 time that of silicon nitride in 20/80 $CF_4/O_2$ and less than ¼ that of silicon nitride in pure $O_2$.

5. The composite of claim 1 wherein said composite is a result of the reaction of:

perylene dianhydride; and an aminosilane having a formula of:

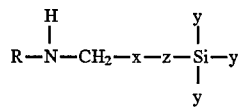

wherein R is selected from the group consisting of H, alkyl and alkylamine; X is selected from the group consisting of alkyl of at least 2 carbons and aryl; Z is alkyl or a direct bond; Y is selected from the group consisting of alkoxy, halo and silazane.

6. The composite of claim 5 wherein the aminosilane is an aminoalkyltrialkoxysilane.

7. The composite of claim 6 wherein the aminoalkyltrialkoxysilane is aminopropyltriethoxysilane.

8. A thermostable composite, consisting essentially of:

(a) a perylene diimide having the structure

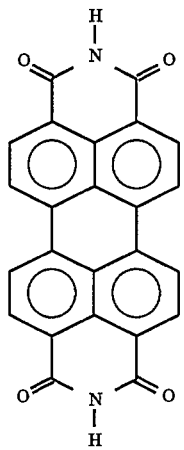

and (b) a poly(silsesquioxane).

9. A thermostable composite according to claim 8 wherein said composite comprises about four silicon atoms in the poly(silsesquioxane) for each molecule of perylene diimide.

10. A thermostable composite according to claim 8 wherein said composite comprises at least four silicon atoms in the poly(silsesquioxane) for each molecule of perylene diimide.

* * * * *

UNITED STATES PATENT AND TRADEMARK OFFICE
CERTIFICATE OF CORRECTION

PATENT NO. : 5,641,838
DATED : Jun. 24, 1997
INVENTOR(S) : Linde et al.

It is certified that error appears in the above-indentified patent and that said Letters Patent is hereby corrected as shown below:

Column 1, lines 4 & 5, delete "5,145,655" and substitute therefor --5,451,655.

Column 1, line 8, delete "is" and substitute therefor --as--.

Column 5, line 27, delete "compound of formula II".

Column 5, lines 32-37, delete "Formula II is meant to indicate that each anhydride of perylene dianhydride has been opened by one mole of amine to provide an amide and a second mole of amine has formed a salt with the liberated carboxylic acid. The substitution pattern is probably statistically random, but this is not known".

Column 5, line 38, delete "intermediate of formula II" and substitute therefor --compound of formula IV--.

The table between columns 7 & 8, Trial 3 under Perylene Dianhydride, delete "3.93g" and substitute therefor --3.92g--.

Signed and Sealed this

Twenty-eighth Day of October, 1997

Attest:

BRUCE LEHMAN

*Attesting Officer*   Commissioner of Patents and Trademarks